(12) United States Patent
Hicks et al.

(10) Patent No.: US 8,353,268 B2
(45) Date of Patent: Jan. 15, 2013

(54) OILING SYSTEM FOR TIMING CHAINS

(75) Inventors: James B. Hicks, Shelby Township, MI (US); Michael A. Gorney, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 421 days.

(21) Appl. No.: 12/838,836

(22) Filed: Jul. 19, 2010

(65) Prior Publication Data

US 2011/0277726 A1 Nov. 17, 2011

Related U.S. Application Data

(60) Provisional application No. 61/345,387, filed on May 17, 2010.

(51) Int. Cl.
*F01M 1/02* (2006.01)
*F02F 1/42* (2006.01)

(52) U.S. Cl. .................. 123/196 R; 123/193.5

(58) Field of Classification Search ............... 123/193.5, 123/196 R
See application file for complete search history.

(56) References Cited

U.S. PATENT DOCUMENTS

2002/0170525 A1* 11/2002 Iizuka et al. .............. 123/196 R

FOREIGN PATENT DOCUMENTS

| EP | 2071143 B1 | 6/2009 |
| KR | 20090061262 A | 6/2009 |

* cited by examiner

*Primary Examiner* — Noah Kamen
(74) *Attorney, Agent, or Firm* — Quinn Law Group, PLLC

(57) ABSTRACT

An oiling system for providing oil to a timing chain adjacent a cylinder head of an engine is provided. The oiling system includes a redirect feature, a vent window defined by the cylinder head, a rail feature, and a transfer feature. The redirect feature is configured to channel oil toward the vent window, the rail feature is configured to channel oil from the vent window to the transfer feature, and the transfer feature is configured to transfer oil to the timing chain. The oil is transferred from the transfer feature to the timing chain at substantially ambient pressure. The engine may be characterized by the absence of a nozzle configured to transfer oil onto the timing chain. Furthermore, the redirect feature, the rail feature, and the transfer feature may all be formed as integral, one-piece structures with the cylinder head.

16 Claims, 3 Drawing Sheets

OILING SYSTEM FOR TIMING CHAINS

CROSS-REFERENCE TO RELATED APPLICATIONS

This application claims the benefit of U.S. Provisional Application No. 61/345,387, filed May 17, 2010, which is hereby incorporated by reference in its entirety.

TECHNICAL FIELD

This disclosure relates to oiling of timing chains for engines.

BACKGROUND

Internal combustion engines may utilize a timing belt or timing chain to control the timing of the engine's valves. The timing belt or chain connects the crankshaft to one or more camshafts or phasers, which in turn control the opening and closing of engine valves.

SUMMARY

An oiling system for providing oil to a timing chain is provided. The timing chain is adjacent a cylinder head of an engine. The oiling system includes a redirect feature, a vent window defined by the cylinder head, a rail feature, and a transfer feature. The redirect feature is configured to channel oil toward the vent window, the rail feature is configured to channel oil from the vent window to the transfer feature, and the transfer feature is configured to transfer oil to the timing chain. The oil is transferred from the transfer feature to the timing chain at substantially ambient pressure.

The engine may be characterized by the absence of a nozzle configured to transfer oil onto the timing chain. Furthermore, the redirect feature, the rail feature, and the transfer feature may all be formed as integral, one-piece structures with the cylinder head.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
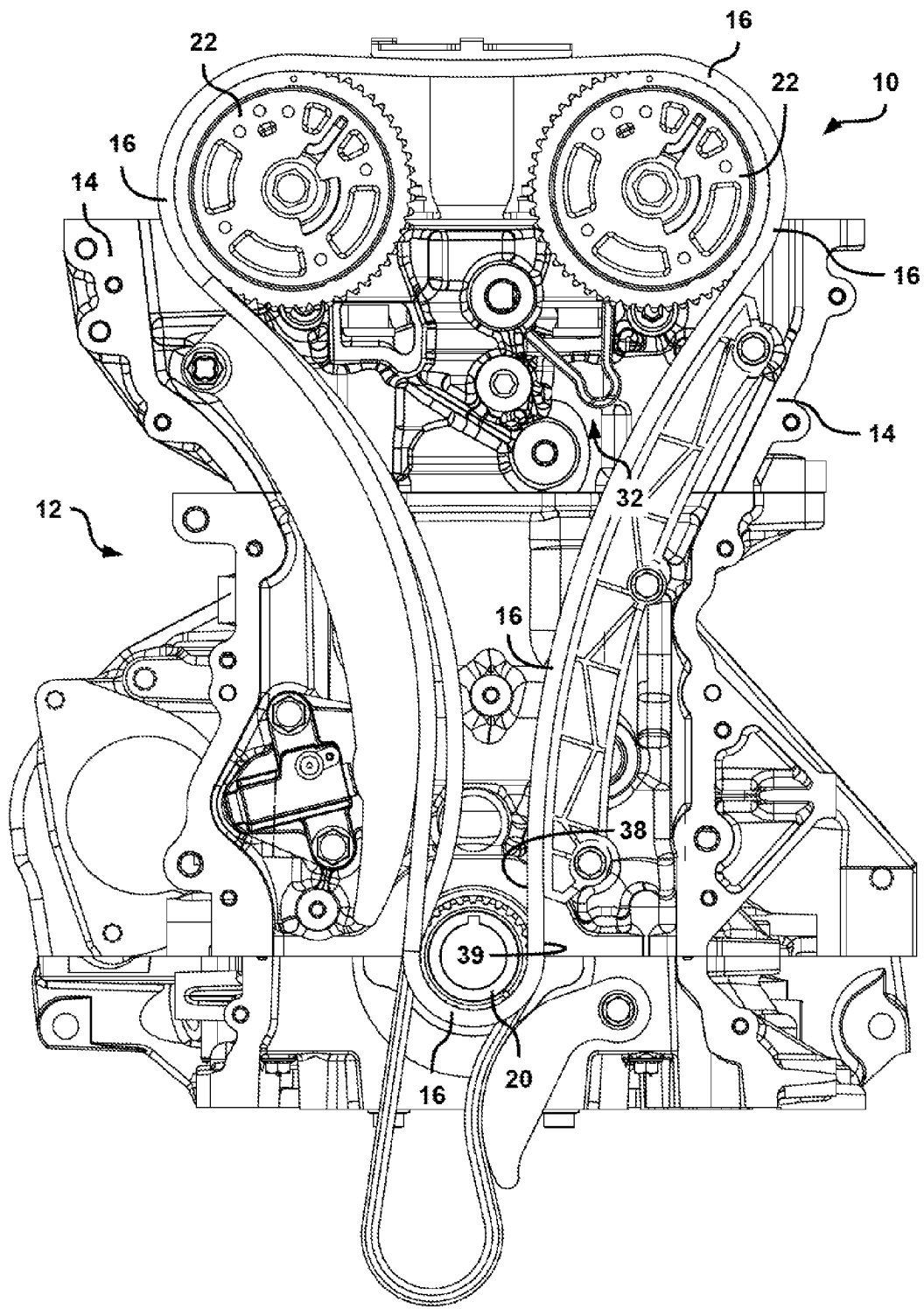
FIG. 1 is a schematic plan view of the front of a portion of an engine, showing a timing chain linking a crankshaft sprocket to two camshaft phasers.

Referring to the drawings, wherein like reference numbers correspond to like or similar components throughout the several figures, there is shown in FIG. 1 a schematic illustrative front view of an oiling system 10 for an engine 12 having a cylinder head 14. Only a portion of the engine 12 is shown in FIG. 1. The oiling system 10 provides motor oil to a timing chain 16 adjacent the cylinder head 14. The motor oil is used to lubricate moving parts of the engine 12 and may also clean, inhibit corrosion of, and cool the engine 12.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The timing chain 16 meshes with teeth on the periphery of a crankshaft sprocket 20 and with sprocket teeth on the periphery of two cam phasers 22. The crankshaft sprocket 20 is attached to, and rotates with, a crankshaft (not shown) of the engine 12. The timing chain 16 rotates or circulates around the crankshaft sprocket 20 and the cam phasers 22 in the clockwise direction, as viewed in FIG. 1. However, the engine 12 may be configured such that the timing chain 16 rotates or circulates in the counter-clockwise direction, as viewed in FIG. 1. As the timing chain 16 is rotated by the crankshaft sprocket 20, the cam phasers 22 are also rotated.

The two cam phasers 22 are attached to respective cam shafts (not shown) and are configured to advance or retard the camshaft position, which varies the timing of valve lift events relative to the crankshaft position. However, one or more camshafts with fixed (non-variable) sprockets may also be used with the oiling system 10.

Figure 3:
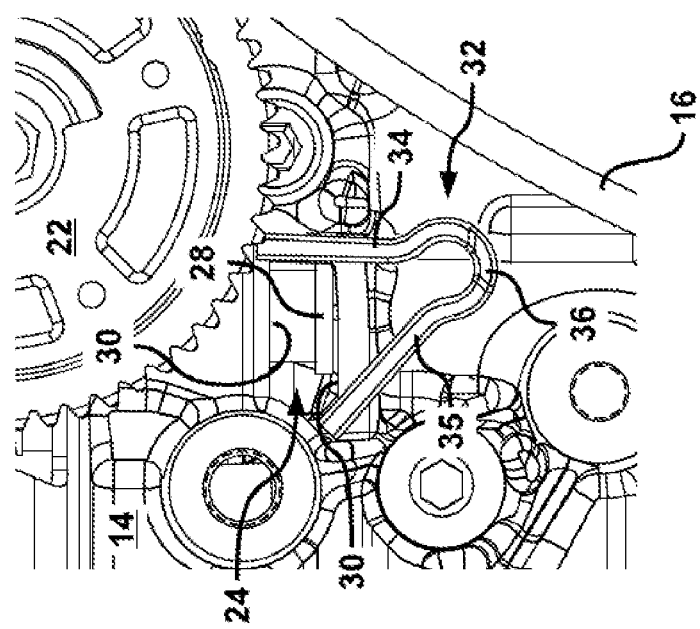
FIG. 3 is a detail view of the view shown in FIG. 1, showing a vent window connecting the front bay to a rail feature.
Figure 2:
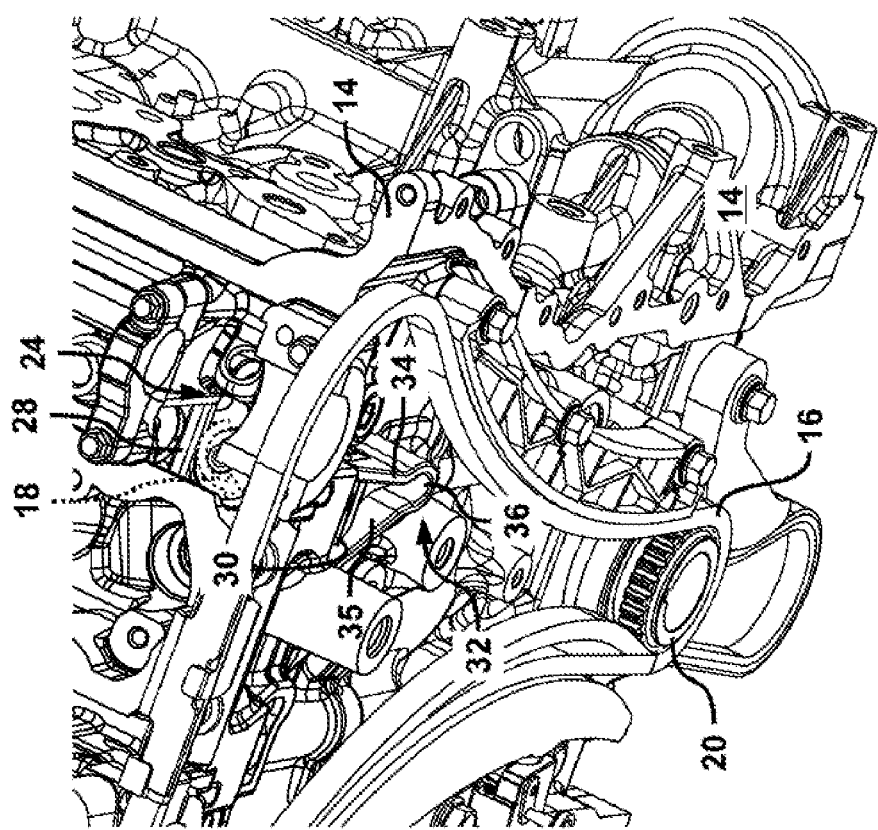
FIG. 2 is a schematic isometric view of a portion of the engine shown in FIG. 1, shown with the camshaft phasers removed in order to provide a better view of a front bay of a cylinder head of the engine.

Referring now to FIGS. 2 and 3, and with continued reference to FIG. 1, there are shown two schematic isometric views of a portion of the engine 12 shown in FIG. 1. In FIG. 2, the camshaft phasers 22 and the timing chain 16 have been removed or hidden from view in order to better view a front bay 24 of the cylinder head 14. FIG. 3 shows a close up (or zoomed-in) view from substantially the same angle as that shown in FIG. 1.

Motor oil collects within the front bay 24 after passing through other components of the engine 12 in and around the front bay 24. For example, and without limitation, motor oil for one or more cam bearings or journals (not shown), lash adjusters (not shown), or the cam phasers 22 may pass through the front bay 24 before being returned to a sump (not shown). Oil collected in the sump may be filtered and pumped back to various components of engine 12. After passing through one or more of the components of the engine 12, the motor oil may be considered drainback oil, as opposed to fresh, filtered oil. However, in some configurations, motor oil which has not passed through another component may also collect or pass through the front bay 24.

A redirect feature 28 is disposed within the front bay 24, and may be formed as an integral, one-piece structure with the cylinder head 14. Flow arrows 18 are shown in the figures as highly-schematic representations of possible pathways or directions of the motor oil flow through the oiling system 10. Flow arrows 18 are illustrative and do not limit the actual path or direction of motor oil in the oiling system 10. The redirect feature 28 shown is an oil dam or short wall. Other redirect features 28 may be used with the oiling system 10, such as, and without limitation, plugs, ribs, beads, or sloping channels.

As used herein, integral, one-piece structures are those formed as a single piece or part and contain substantially continuous material. Components which are formed separately and then attached—via fasteners, welding, adhesives, clips, latches, or other joining techniques—are not integral, one-piece structures. For example, and without limitation, features or components which are cast together or machined from a single billet are integral, one-piece structures. However, an integral, one-piece structure may still undergo subsequent treatments or manufacturing processes following formation of the single piece.

A vent window 30 is defined by the cylinder head 14 and creates a passageway or path from the front bay 24 to the side of engine 12 having the crankshaft sprocket 20. The redirect feature 28 is configured to channel or direct motor oil toward the vent window 30. Therefore, the redirect feature 28 prevents some, or all, of the drainback oil collecting in the front bay 24 from returning directly to the sump.

A rail feature 32 may be formed as an integral, one-piece structure with the cylinder head 14. The vent window 30 links the front bay 24 and the rail feature 32, such that motor oil collected in the front bay 24 is directed by the redirect feature 28 through the vent window 30 to the rail feature 32.

The rail feature 32 shown in the figures includes a first side 34 and a second side 35. The first side 34 and the second side 35 connect or converge at a transfer feature 36. The transfer feature 36 may also be formed as an integral, one-piece structure with the cylinder head 14 and the rail feature 32. The rail feature 32 channels or carries motor oil from the vent window 30 to the transfer feature 36. The transfer feature 36 then transfers motor oil to the timing chain 16 by dripping or pouring motor oil onto the timing chain 16.

Other shapes and configurations of the rail feature 32 and the transfer feature 36 may be used to collect and transfer motor oil from the vent window 30 to the timing chain 16. The first and second sides 34, 35 of the rail feature 32 shown in the figures form a generally V-shaped cavity with the transfer feature 36, such that the rail feature 32 is configured to funnel motor oil to the transfer feature 36.

Figure 5:
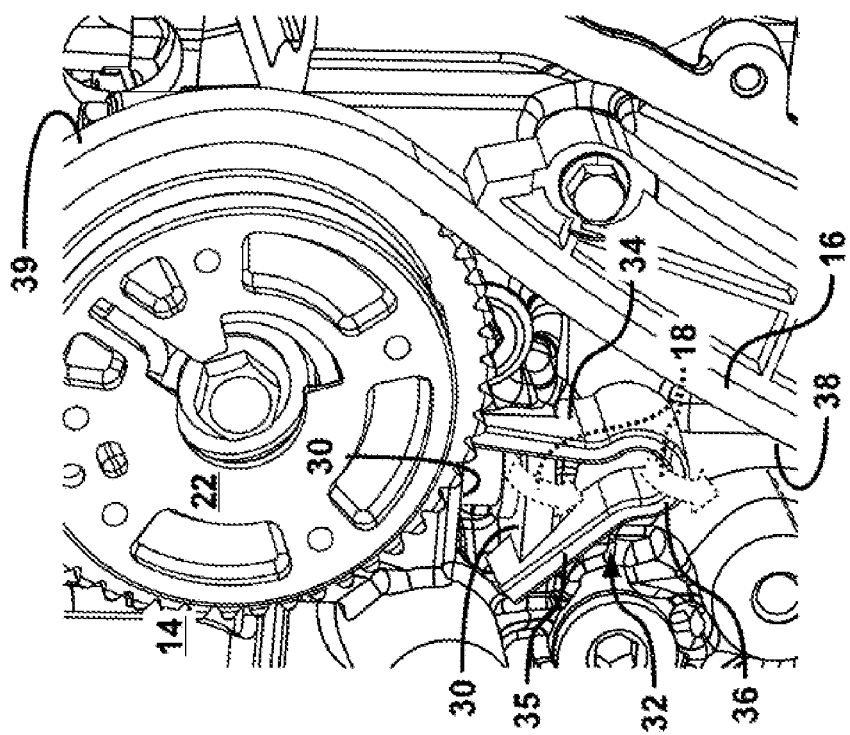
FIG. 5 is another schematic isometric view of a portion of the engine shown in FIG. 1, showing the vent window and the rail feature from a different angle.
Figure 4:
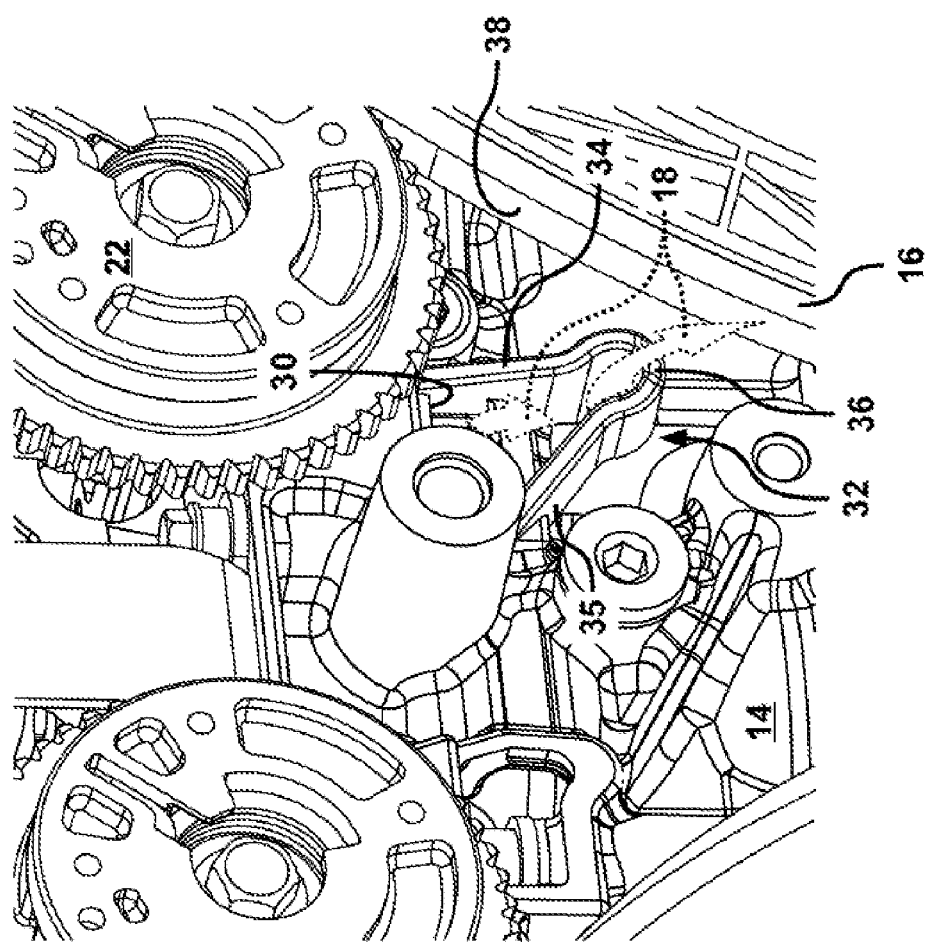
FIG. 4 is a schematic isometric view of a portion of the engine shown in FIG. 1, showing the vent window and the rail feature in relation to the timing chain.

Referring now to FIGS. 4 and 5, and with continued reference to FIGS. 1-3, there are shown two schematic isometric views of a portion of the engine 12. FIG. 4 shows the vent window 30 and the rail feature 32 in relation to the timing chain 16 from one angle or viewpoint and FIG. 5 from a different angle or viewpoint.

As shown in FIGS. 4 and 5, motor oil collected in the front bay 24 is channeled to the vent window 30 by the redirect feature 28. The motor oil is then collected by the rail feature 32 and delivered to the transfer feature 36 where it falls onto the timing chain 16. Flow arrows 18 schematically illustrate a representative flow path for the motor oil between the front bay 24 and the timing chain 16.

The rail feature 32 may be shaped differently than shown in the figures. For example, and without limitation, the rail feature 32 may be a generally-cylindrical rod angling downward from the vent window 30 such that the transfer feature 36 is the end of the rod and is located just above the timing chain 16. The rail feature 32 may also have a tapered or airfoil shape, with a point or dimple-shaped transfer feature 36 formed thereupon. Alternatively, the rail feature 32 may be a chute or a slide cantilevered from the vent window 30 to just above the timing chain 16.

The timing chain 16 has an interior 38 and an exterior 39, which are defined by the closed loop or path formed as the timing chain 16 rotates. The interior 38 of the timing chain 16 faces into the loop and the exterior 39 faces away from the loop. As shown in FIG. 4, the transfer feature 36 is configured to direct oil onto the interior 38 of the timing chain 16. Furthermore, the transfer feature 36 shown in the figures is configured to direct oil onto the timing chain 16 before the timing chain 16 meshes with the crankshaft sprocket 20, relative to the direction of rotation of the timing chain 16. This may be referred to as the leading edge of the timing chain 16, relative to the crankshaft sprocket 20. Therefore, in the configuration shown, motor oil is delivered initially to the teeth of the crankshaft sprocket 20 making contact with the timing chain 16 (this is the right side of the crankshaft sprocket 20, as viewed in FIG. 1).

The timing chain 16 is located on a timing plane (or timing chain plane) which is offset from the vent window 30. The timing plane is defined, generally, as the plane formed by the centerline of the timing chain 16 and the sprockets with which the timing chain 16 meshes. Manufacturing variations may result in slight offsets of the crankshaft sprocket 20 or the cam phasers 22 relative to each other. However, the timing chain 16 will usually circulate throughout its path while in substantially the same plane.

The rail feature 32 spans from the vent window 30 to the timing plane, such that the transfer feature 36 may be substantially coincident with the timing plane and delivers motor oil to, or near, the center line of the timing chain 16. Locating the transfer feature 36 substantially on the timing plane allows transfer of motor oil to the timing chain 16 without spraying or projecting pressurized oil. The rail feature 32 may be configured to function at a variety of installation angles for the engine 12, while still delivering motor oil onto the timing chain 16.

The oiling system 10 shown in the figures does not include a nozzle configured to transfer or apply motor oil directly to the timing chain 16. Such a dedicated nozzle would be supplied by the oil pump (not shown) and spray motor oil directly onto the timing chain 16. As used herein, nozzles include jets, sprays, and other devices propelling pressurized oil from one location (the nozzle outlet) to another (the target).

The oiling system 10 for the timing chain 16 may be considered a passive system. The motor oil is collected and transferred to the timing chain 16 at substantially ambient pressure, as opposed to being pumped at increased pressure to the timing chain 16. Furthermore, the oiling system 10 for the timing chain 16 uses gravity to transfer drainback oil from the cylinder head 14 to the timing chain 16. Depending upon the orientation and mounting angle of the engine 12 in the vehicle, the rail feature 32 and transfer feature 36 may be angled to more precisely deliver motor oil to the timing chain 16.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:
1. An oiling system for providing oil to a timing chain adjacent a cylinder head of an engine, comprising:
  a redirect feature formed as an integral, one-piece structure with the cylinder head;
  a vent window defined by the cylinder head, wherein the redirect feature is configured to channel oil toward the vent window;
  a rail feature formed as an integral, one-piece structure with the cylinder head; and
  a transfer feature formed as an integral, one-piece structure with the cylinder head, wherein the rail feature is configured to channel oil from the vent window to the transfer feature and the transfer feature is configured to trans- fer oil to the timing chain, wherein the oil is transferred from the transfer feature to the timing chain at substantially ambient pressure.

2. The oiling system of claim 1, wherein the engine is characterized by the absence of a nozzle configured to transfer oil onto the timing chain.

3. The oiling system of claim 2, wherein the cylinder head includes a front bay, and:
   wherein the redirect feature is disposed within the front bay; and
   wherein the vent window defines a passage from the front bay to the rail feature.

4. The oiling system of claim 3,
   wherein the timing chain has an inside and an outside; and
   wherein the transfer feature is configured to direct oil onto the inside of the timing chain.

5. The oiling system of claim 4,
   wherein the timing chain defines a timing plane which is offset from the vent window;
   wherein the rail feature spans from the vent window to the timing plane; and
   wherein the transfer feature is substantially coincident with the timing plane.

6. The oiling system of claim 5, wherein the timing chain meshes with, and rotates about, a crankshaft sprocket of the engine,
   wherein the transfer feature is configured to direct oil onto the timing chain before the timing chain meshes with the crankshaft sprocket, relative to the direction of rotation of the timing chain.

7. The oiling system of claim 6, wherein the rail feature includes:
   a first side; and
   a second side, wherein the first and second sides of the rail feature form a generally V-shaped cavity with the transfer feature, such that the rail feature is configured to funnel oil to the transfer feature.

8. The oiling system of claim 7, wherein the cylinder head further includes a cam bearing, a lash adjuster, and a phaser,
   wherein oil having passed through one of said cam bearing, lash adjuster, and phaser is considered drainback oil; and
   wherein the redirect feature is configured to channel the drainback oil toward the vent window.

9. The oiling system of claim 8, wherein the oil is transferred from the transfer feature to the timing chain via gravity.

10. An oiling system for providing oil to a timing chain adjacent a cylinder head of an engine, comprising:
    a redirect feature;
    a vent window defined by the cylinder head, wherein the redirect feature is configured to channel oil toward the vent window;
    a rail feature, wherein the timing chain defines a timing plane which is offset from the vent window and the rail feature spans from the vent window to the timing plane; and
    a transfer feature, wherein the rail feature is configured to channel oil from the vent window to the transfer feature and the transfer feature is configured to transfer oil to the timing chain, and wherein the transfer feature is substantially coincident with the timing plane and the oil is transferred from the transfer feature to the timing chain at substantially ambient pressure.

11. The oiling system of claim 10,
    wherein the redirect feature is formed as an integral, one-piece structure with the cylinder head;
    wherein the rail feature is formed as an integral, one-piece structure with the cylinder head; and
    wherein the transfer feature is formed as an integral, one-piece structure with the cylinder head and the rail feature.

12. The oiling system of claim 11, wherein the engine is characterized by the absence of a nozzle configured to transfer oil onto the timing chain.

13. The oiling system of claim 12, wherein the cylinder head further includes a cam bearing, a lash adjuster, and a phaser,
    wherein oil having passed through one of said cam bearing, lash adjuster, and phaser is considered drainback oil; and
    wherein the redirect feature is configured to channel the drainback oil toward the vent window.

14. The oiling system of claim 13, wherein the rail feature includes:
    a first side; and
    a second side, wherein the first and second sides of the rail feature form a generally V-shaped cavity with the transfer feature, such that the rail feature is configured to funnel oil to the transfer feature.

15. The oiling system of claim 14, wherein the timing chain meshes with, and rotates about, a crankshaft sprocket of the engine,
    wherein the transfer feature is configured to direct oil onto the timing chain before the timing chain meshes with the crankshaft sprocket, relative to the direction of rotation of the timing chain.

16. The oiling system of claim 15,
    wherein the timing chain has an inside and an outside; and
    wherein the transfer feature is configured to direct oil onto the inside of the timing chain.

\* \* \* \* \*